United States Patent [19]

Pchenitchnikov et al.

[11] Patent Number: 6,053,814

[45] Date of Patent: Apr. 25, 2000

[54] SYSTEM AND METHOD FOR AUTOMATICALLY ADJUSTING GAME CONTROLLER SENSITIVITY TO PLAYER INPUTS

[75] Inventors: Andrei E. Pchenitchnikov, Sunnyvale; Geurt B. de Raad, Union City, both of Calif.

[73] Assignee: Logitech, Inc., Fremont, Calif.

[21] Appl. No.: 08/985,305

[22] Filed: Dec. 4, 1997

[51] Int. Cl.[7] .................................................. A63F 9/22
[52] U.S. Cl. .................. 463/36; 463/37; 463/42; 463/43; 273/148 B; 345/156
[58] Field of Search .................. 463/36, 37, 38, 463/39, 42, 43, 44; 273/148 B; 345/156, 158

[56] References Cited

U.S. PATENT DOCUMENTS

| | | | |
|---|---|---|---|
| 4,015,846 | 4/1977 | Runte et al. | 273/85 R X |
| 4,093,221 | 6/1978 | Dash | 273/85 G X |
| 4,114,882 | 9/1978 | Mau | 273/85 G X |
| 5,508,717 | 4/1996 | Miller | 345/145 |
| 5,613,911 | 3/1997 | Takemoto et al. | 463/25 X |
| 5,650,608 | 7/1997 | Redford et al. | 250/210 X |
| 5,847,694 | 12/1998 | Redford et al. | 345/158 X |
| 5,860,861 | 1/1999 | Lipps et al. | 463/36 X |
| 5,890,906 | 4/1999 | Macri et al. | 434/247 X |
| 5,896,125 | 4/1999 | Niedzwiecki | 345/168 X |
| 5,933,152 | 8/1999 | Naruki et al. | 345/501 X |

*Primary Examiner*—Lee Young
*Assistant Examiner*—Binh-An Nguyen
*Attorney, Agent, or Firm*—Fenwick & West LLP

[57] ABSTRACT

The present invention automatically adjusts the sensitivity of a game controller to a player's input. A n-dimensional speed vector having components that are indicative of the speed of an object in an n-dimensional game environment is read from the output of the game controller. Those speed vector components with small dynamics (e.g., small speeds) relative to the other speed vector components are suppressed, thereby producing a filtered speed vector. The components of the filtered speed vector are then tested for oscillations. Oscillations in the components of the filtered speed vector are indicative of small displacements made by the player while focusing on a game task requiring additional controller precision (e.g., focusing on a target). When such oscillations are detected, the ratio of the speed of the object, over the displacement of the game controller (e.g., deflection) is adjusted to some predetermined value. The adjusted sensitivity allows the player to make more precise movements of the object in the game environment without a priori information about the game scenario. When the oscillations exceed a predetermined threshold, the game controller sensitivity is returned to its pre-oscillation state.

14 Claims, 7 Drawing Sheets

SYSTEM AND METHOD FOR AUTOMATICALLY ADJUSTING GAME CONTROLLER SENSITIVITY TO PLAYER INPUTS

BACKGROUND OF THE INVENTION

1. Field of the Invention

This invention relates to game controllers for playing computer games, and more particularly, to game controller sensitivity with respect to player inputs.

2. Description of the Related Art

The advent of improved computer games has spawned a revolution in the computer gaming industry. Many new games are developed each year that take advantage of the latest technology advancements. These new games typically allow the user to control the position of an object (e.g., aircraft, gun, robot) in a three-dimensional game environment created by the game software and presented as a video image on a visual display. In some games, the player may also control the angular orientation of the object in the three-dimensional game environment.

To fully enjoy these new games, sophisticated game controllers with six degrees-of-freedom (e.g., three for a linear displacement along an X-axis, Y-axis, and Z-axis, and three angular displacements in a roll, pitch, and yaw orientation, respectively) were developed. These game controllers assist the user in performing 360° combination maneuvers, such as flips and spins, without the player touching the keyboard or game controller buttons, or spinning a "spinner" knob. One example of an advanced game controller is the CYBERMAN 2, developed by Logitech Inc. of Fremont, Calif. This game controller has a spring type mechanical attachment to a base that, when combined with digital technology, allows a player to move realistically in all directions in gaming and virtual reality environments.

Controlling an object in a three-dimensional game environment is more difficult than controlling the same object in a two-dimensional plane. Any undesired, redundant movements of the player's hand results in inter-axis influences. These influences tend to cause the game controller to report axis values that are not under the player's direct or desired control. Conventional game controllers do not account for these influences which result in diminished player control over the object in the game environment.

Furthermore, there are certain game scenarios that require the player to precisely move the object in the game environment. For example, in one particular game scenario, it may be necessary to focus the object (e.g., a gun) on a fast moving target. To successfully hit the target, a typical player will attempt to track the target with increasingly precise movements of the game controller. For this level of play, it is desired that the ratio of the speed of the object, over the displacement of the game controller, be some value less than one. Having a ratio less than one provides the player with greater control over the object for small displacements of the game controller.

Unfortunately, it is not known a priori when the player will need such additional control over the object. Most game scenarios change too quickly for the player to manually adjust the game controller sensitivity while playing the game. Moreover, the large number of game scenarios combined with the virtually unlimited number of player responses to such scenarios, prohibits the game software itself from adjusting the game controller sensitivity. Even more important, is the prevalent industry philosophy that software games should challenge the player by not giving the player unwanted assistance in obtaining the goals of the game. In other words, it is desirable to assist the player in acquiring the target without guiding the player to the target.

Conventional game controllers do not give a player additional control over the object during a game scenario. As a result, the player becomes frustrated with the response of the game controller to the player's inputs, thereby diminishing the player's enjoyment of the game.

Accordingly, there is a need for a system that automatically adjusts game controller sensitivity to player inputs. Such a system must be able to determine, during a game, when and by how much the game controller sensitivity should be adjusted to suit the player's needs for a particular game scenario. Such a system should be able to work with a variety of game controllers and game software.

It is further desired that the system suppress undesired, redundant movements of the player's hand which tend to cause the game controller to report axis values that are not under the player's direct or desired control.

SUMMARY OF THE INVENTION

The present invention automatically adjusts the sensitivity of a game controller to a player's input. It determines, during a game, when and by how much the game controller sensitivity should be adjusted to suit the player's needs for a particular game scenario.

Specifically, an n-dimensional speed vector (n being an integer value) is read from the output of the game controller at predetermined intervals of time, for example, once each second. The components of the speed vector are indicative of the speed of the player controlled object in an n-dimensional game environment presented as a video image on a visual display. The speed vector is filtered by a dynamic data filter to eliminate vector components having small values relative to other speed vector components. The filtered speed vector is then tested for oscillations about a zero speed (with some tolerance) for each of the speed vector components. Oscillations inside predetermined limits are indicative of small displacements made by the player while focusing on a game task requiring additional controller precision (e.g., focusing on a target). When such oscillations are detected, the ratio of the speed of the object in the game environment, over the mechanical displacement of the game controller (e.g., deflection) is adjusted to some predetermined value. This adjusted sensitivity gives the player better control over the object without a priori information about the game scenarios. When the amplitude of the oscillations exceeds predetermined limits, the game controller sensitivity is returned to its pre-oscillation state.

One embodiment of an attractor system that automatically adjusts the sensitivity of a game controller in response to a player's inputs includes an oscillation detector coupled to receive from a game controller one or more values. These values are indicative of the speed of an object controlled by the player in a game environment. The oscillation detector detects those values that are oscillating about a zero object speed. In response to a detected oscillation, a sensitivity adjuster coupled to the output of the oscillation detector adjusts the sensitivity of the game controller to the player's inputs. This adjustment allows the player to better control the object in the game environment. The output of the sensitivity adjuster is coupled to a computer system for communicating the speed of the object to the game environment.

A second embodiment of the attractor system further includes a dynamic data filter. The dynamic data filter has inputs and outputs. The inputs are coupled to the game controller for receiving values indicative of the speed of the player controlled object in the game environment. The outputs are coupled to the inputs of the oscillation detector. The dynamic data filter suppresses those object speeds having values less than a predetermined threshold, while passing through to the oscillation detector those object speeds that exceed the predetermined threshold.

These and other features, aspects, and advantages of the present invention will become better understood with regard to the following description, appended claims, and accompanying drawings.

DETAILED DESCRIPTION OF THE INVENTION

Figure 1A:
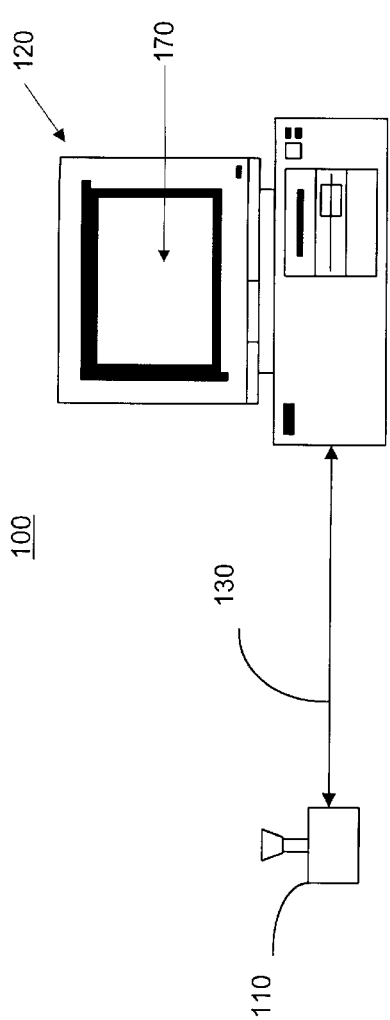
FIG. 1A is a diagram of one embodiment of a gaming system in accordance with the present invention.

Referring to FIG. 1A, there is an illustration of a gaming system 100. The gaming system 100 includes a game controller 110 and a computer system 120 that includes a visual display 170. The game controller 110 is coupled to the computer system 120 by a communication link 130. The communication link 130 is, for example, a bi-directional serial data bus. The game controller 110 is, for example, a joystick.

The game controller 110 is used to indicate the position and speed of a player controlled object in a game environment which is typically presented as a video image on the visual display 170. The term "object," as used herein, may be any object presented on the visual display 170 that is controlled by the player via the game controller 110.

A conventional game controller typically has a rod or pistol grip that protrudes vertically from a base. Inside the base are, for example, a set of potentiometers that can sense when the rod is deflected from a vertical or "neutral" position. The potentiometers produce electrical signals that represent the current position of the rod.

These game controllers usually indicate only two-dimensional positions by moving the rod laterally, but there are also three-dimensional game controllers in which the third dimension is indicated by rotation of the rod or by spinning a knob or moving a slider that is located on the base. Similar to a pointing device, conventional game controllers are good for gross movement, but not necessarily for precision work.

Digital game controllers provide players with improved gaming performance by providing greater precision and accuracy than their analog counterparts. This is accomplished by converting the electrical signals generated by the potentiometers to integer values (e.g., quantization) before transmitting them to the computer system 120 via the communication link 130. The computer system 120 receives these integer values and provides the corresponding speed of the object in the game environment presented as a video image on the visual display 170.

Figure 1B:
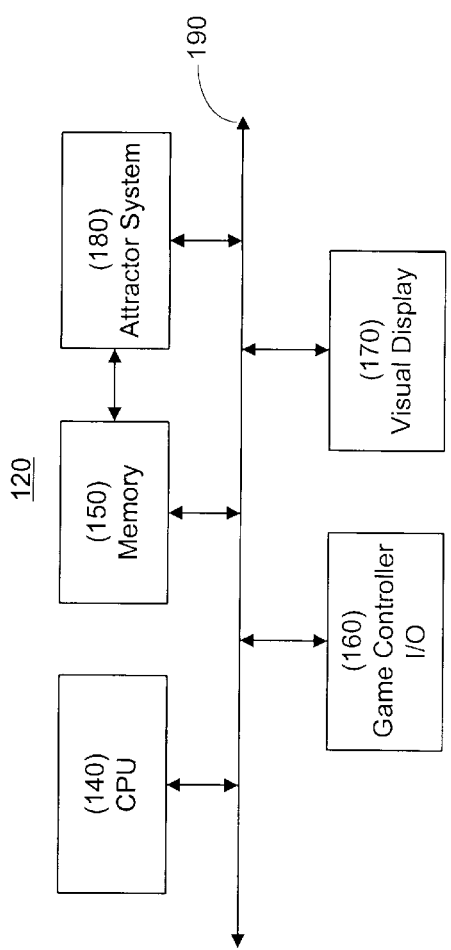
FIG. 1B is a block diagram of one embodiment of a computer system in accordance with the present invention.

While the description that follows refers to digital game controllers, the present invention is equally valid for analog game controllers that provide signals that are processed by, for example, a game controller I/O 160 as further described in conjunction with FIG. 1B, before being used by the game software.

The computer system 120 provides a platform for a game environment. The computer system 120 preferably is a personal computer (PC), but other computer systems, including computer networks and the Internet, can provide a suitable platform for the game environment.

Referring to FIG. 1B, there is shown a block diagram of one embodiment of the computer system 120. While the elements shown in FIG. 1B were selected to better illustrate the present invention, other elements may also be included with the computer system 120 (e.g., keyboard, power supply, graphics accelerators). The computer system 120 preferably includes a central processing unit (CPU) 140, a memory 150, a game controller I/O 160, a visual display 170, an attractor system 180, and a data bus 190.

The CPU 140 is coupled to the data bus 190. The data bus 190 is, for example, an Industry Standard Architecture (ISA) bus used in conventional PCs. The CPU 140 executes the game software and manages the computing environment including software drivers and an operating system. The operating system, such as Windows™ 95 developed by Microsoft® Corporation of Redmond, Wash., provides system services to the attractor system 180 and the game controller 110 via the data bus 190.

The memory 150 is coupled to the data bus 190 and the attractor system 180. It is conventional computer memory and implemented with conventional memory devices, for example, random access memory (RAM) or dynamic random access memory (DRAM). The memory 150 caches parameters for the attractor system 180.

The game controller I/O 160 is coupled to the data bus 190 and provides a conventional interface (e.g., 15-pin game port) between the game controller 110 and the computer system 120.

The attractor system 180 is coupled to the data bus 190 and the memory 150. It automatically adjusts the sensitivity of the game controller 110 in response to the player's inputs.

Figure 2:
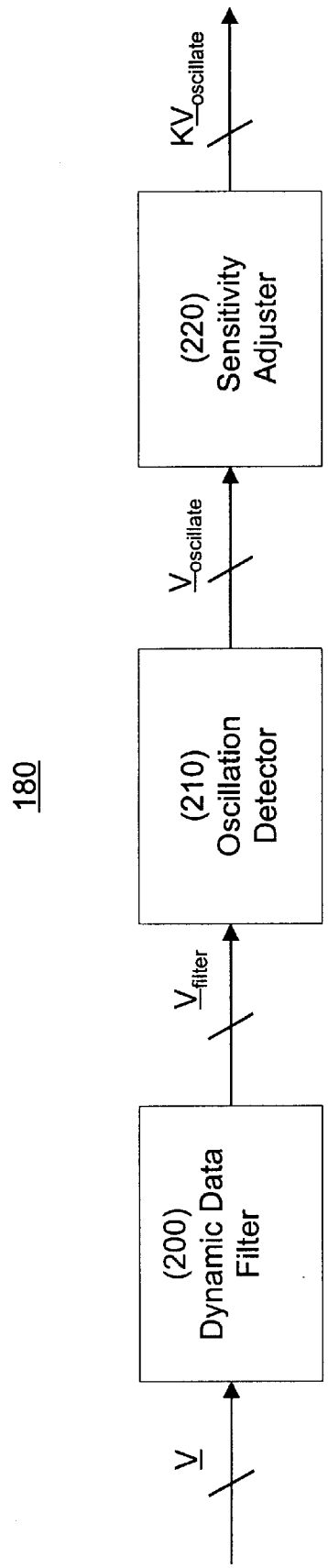
FIG. 2 is a block diagram of one embodiment of an attractor system in accordance with the present invention.

Referring to FIG. 2, there is shown a block diagram of one embodiment of the attractor system 180. While the embodiment shown in FIG. 2 receives input values from the game controller 110 over parallel data lines, a single data line is equally valid for the present invention. Each input value from the game controller 110 is indicative of an instant object speed in a n-dimensional game environment (n being an integer value) that is controlled by the player through the game controller 110. For convenience, these values are processed as the components of an instant speed vector (hereinafter also referred to as $\underline{V}$).

For a three-dimensional game environment where the player can control the object along three degrees-of-freedom (3-DOF), the components of $\underline{V}$ represent the instant speed of the object in the game environment along three orthogonal coordinate axes. Alternatively, the game environment may allow the player to control the object speed along six degrees-of-freedom (6-DOF). In a 6-DOF system, the speed vector $\underline{V}$ has six components—three components indicative of the linear speed of the object along the three orthogonal coordinate axes plus three components indicative of the angular speed of the object about these same coordinate axes. These angular components of the speed vector are, for example, the conventional yaw, pitch, and roll angular rates used in spacecraft navigation.

The description that follows is with respect to an eight-bit digital 3-DOF game controller but is equally applicable to other game controllers including a 6-DOF game controller. The speed vector $\underline{V}$ includes three components indicative of the linear speed of the object in a three-dimensional space along an X-axis, a Y-axis, and a Z-axis (hereinafter also referred to as $V_x$, $V_y$, and $V_z$). Each component is represented by an integer from, for example, the set of integers $\{0, 255\}$. This integer range defines the resolution of the speed vector components $V_x$, $V_y$, and $V_z$.

FIG. 2 illustrates components of the attractor system 180 in accordance with the present invention. The attractor system 180 includes a dynamic data filter 200, an oscillation detector 210, and a sensitivity adjuster 220.

The dynamic data filter 200 preferably has one or more inputs and outputs. The inputs of the dynamic data filter 200 are coupled to the game controller 110 for receiving input values representing the current speed of the object in a three-dimensional game environment presented as a video image on a visual display 170. The dynamic data filter 200, described in detail below, suppresses those components of $\underline{V}$ having values less than a dynamically predetermined threshold.

The oscillation detector 210 preferably has one or more inputs and outputs. The inputs of the oscillation detector 210 are coupled to the outputs of the dynamic data filter 200 for receiving a filtered speed vector (hereinafter also referred to as $\underline{V}_{filter}$). The oscillation detector 210 detects oscillation in the components of $\underline{V}_{filter}$, and in response generates an oscillating speed vector (hereinafter also referred to as $\underline{V}_{oscillate}$), where each component of the vector $\underline{V}_{oscillate}$ oscillates. Those components of $\underline{V}_{filter}$ that do not oscillate do not need adjusting and, therefore, are not passed through to the sensitivity adjuster 220.

The sensitivity adjuster 220 has one or more inputs and outputs. The inputs of the sensitivity adjuster 220 are coupled to the outputs of the oscillation detector 210 for receiving the vector $\underline{V}_{oscillate}$. The sensitivity adjuster 220 scales the vector $\underline{V}_{oscillate}$ so that the sensitivity of the game controller 110 is increased. In other words, small mechanical displacements of the game controller 110 provided by the player, provide even smaller object speed adjustments in the game environment.

The output of the sensitivity adjuster 220 provides a scaled version of the speed vector $\underline{V}_{oscillate}$ (hereinafter also referred to as $K\underline{V}_{oscillate}$, where K is a ratio). It is this scaled speed vector that the game software uses to determine the speed of the object in the game environment relative to the mechanical deflection of the game controller 110. The ratio, K, is the ratio of the speed of the object in the game environment, over the mechanical displacement of the game controller 110 by the player. The ratio K is further described in detail in conjunction with FIG. 5.

Figure 3:
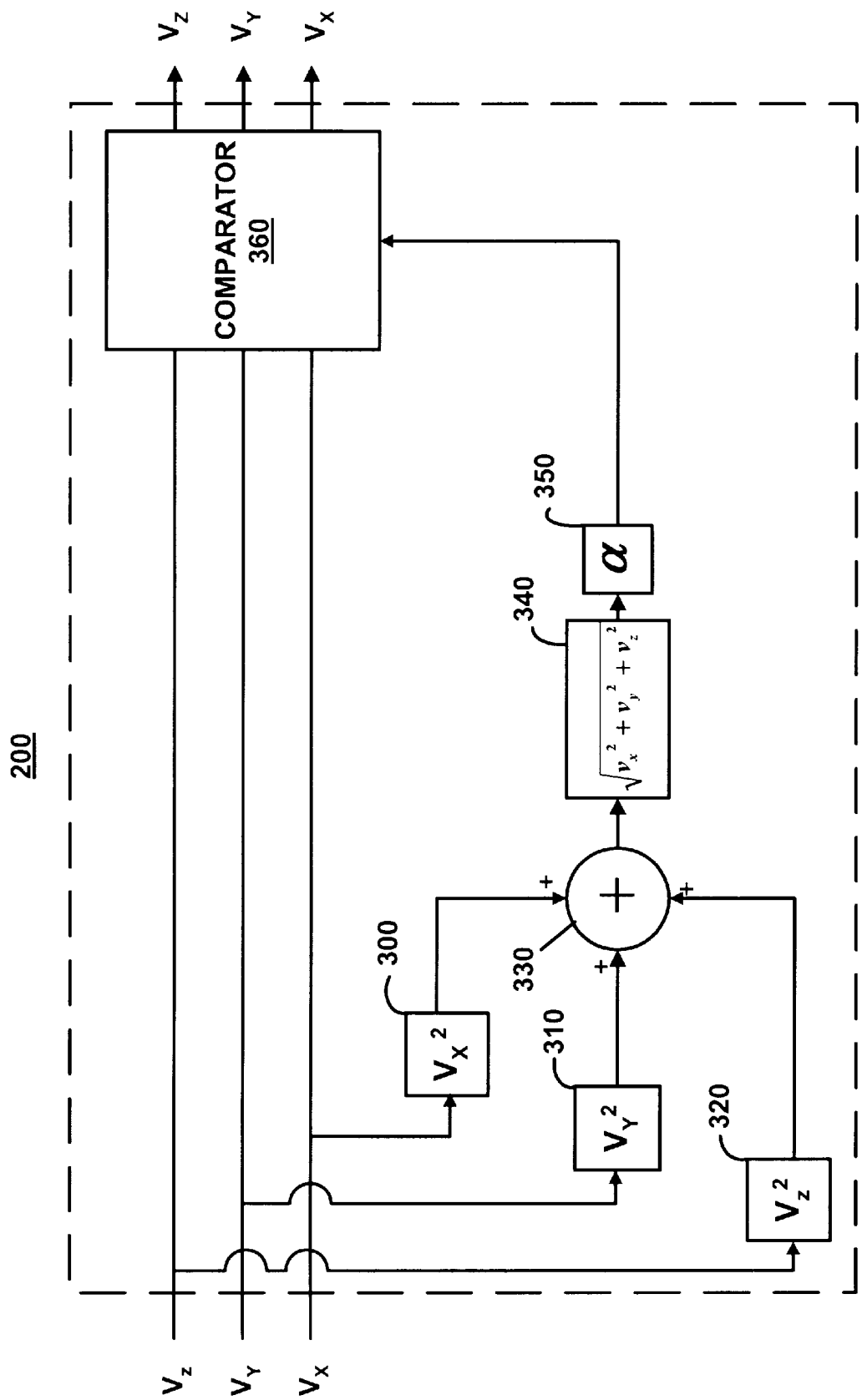
FIG. 3 is a block diagram of one embodiment of a dynamic data filter in accordance with the present invention.

Referring to FIG. 3, there is a block diagram of one embodiment of a dynamic data filter 200.

As shown in FIG. 2, the dynamic data filter 200 has one or more inputs and outputs. At least one input of the dynamic data filter 200 is coupled to the game controller 110 for receiving the components of $\underline{V}$, which are $V_x$, $V_y$, and $V_z$, respectively. At least one output of the dynamic data filter 200 is coupled to the oscillation detector 210 as shown in FIG. 2.

The dynamic data filter 200 preferably includes a first squaring module 300, a second squaring module 310, a third squaring module 320, an adder 330, a root-sum-square (RSS) module 340, a scaling module 350, and a comparator 360.

The first squaring module 300 has an input and an output. The input of the first squaring module 300 is coupled to the game controller 110 for receiving $V_x$. The first squaring module multiplies $V_x$ by itself to produce the square of $V_x$.

The second squaring module 310 has an input and an output. The input of the second squaring module 310 is coupled to the game controller 110 for receiving $V_y$. The second squaring module multiplies $V_y$ by itself to produce the square of $V_y$.

The third squaring module 320 has an input and an output. The input of the third squaring module 320 is coupled to the game controller 110 for receiving $V_z$. The third squaring module multiplies $V_z$ by itself to produce the square of $V_z$.

The adder 330 has one or more inputs and an output. At least three inputs of the adder 330 are coupled to the outputs of the squaring modules 300, 310, and 320, for adding the squares of $V_x$, $V_y$, and $V_z$, respectively.

The RSS module 340 has an input and an output. The input of the RSS module 340 is coupled to the adder 330 for receiving the sum of the squares of $V_x$, $V_y$, and $V_z$. The RSS module 340 takes the square root of the sum of the squares of $V_x$, $V_y$, and $V_z$, to produce the magnitude of the speed vector $\underline{V}$ (hereinafter also referred to as $|\underline{V}|$).

The scaling module 350 has an input and an output. The input of the scaling module 350 is coupled to the output of the RSS module 340 for receiving the magnitude of the speed vector $|\underline{V}|$. The scaling module 350 scales $|\underline{V}|$ (hereinafter also referred to as $\alpha|\underline{V}|$), where $\alpha \in (0,1)$.

The comparator 360 has a one or more inputs and outputs. At least three inputs of the comparator 360 are coupled to receive $V_x$, $V_y$, and $V_z$, respectively. A fourth input of the comparator 360 is coupled to the output of the scaling module 350 for receiving the value $\alpha|\underline{V}|$. The comparator 360 compares the $V_x$, $V_y$, and $V_z$, with the value $\alpha|\underline{V}|$ according to the following conditions:

$V_x < \alpha|\underline{V}|$, $V_y < \alpha|\underline{V}|$, $V_z < \alpha|\underline{V}|$, where $\alpha \in (0,1)$. The $\alpha$ value is a scalar that can be set by the player through the game software, or alternatively, the $\alpha$ value can be stored in the game controller 110 itself.

In accordance with the present invention, the comparator 360 considers as noise any component of $\underline{V}$ that satisfies the above conditions. For example, if $V_x$ has a value less $\alpha|V|$, then $V_x$ will be suppressed and will not pass through to the oscillation detector 210. In other words, only those components of $\underline{V}$ with large speeds relative to the other components of $\underline{V}$ will pass through the dynamic data filter 200 to the oscillation detector 210.

An advantage of the dynamic data filter 200 is the elimination of inter-axis influences generated by undesired, redundant movements of the player's hands, without reducing the sensitivity of the game controller 110. These influences tend to cause the game controller to report values in axes that are not under the player's direct or desired control via the game controller 110.

Figure 4B:
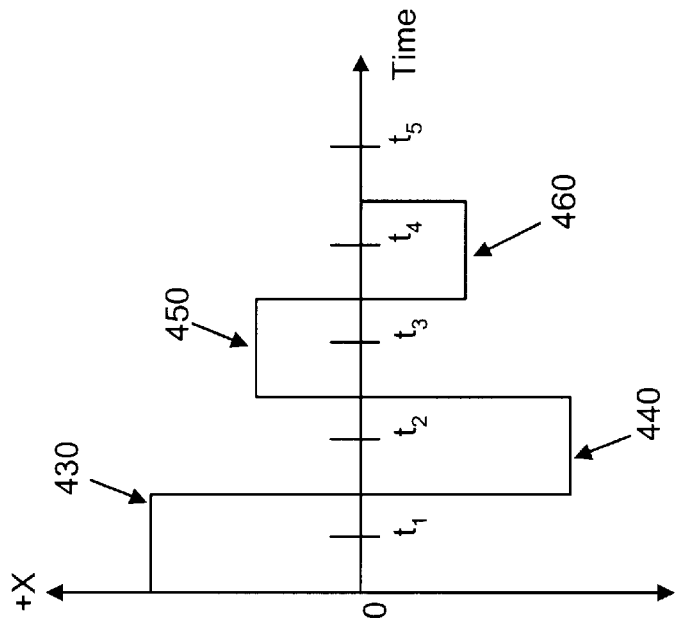
FIGS. 4A and 4B are illustrations of one embodiment of an oscillation detector in accordance with the present invention.
Figure 4A:
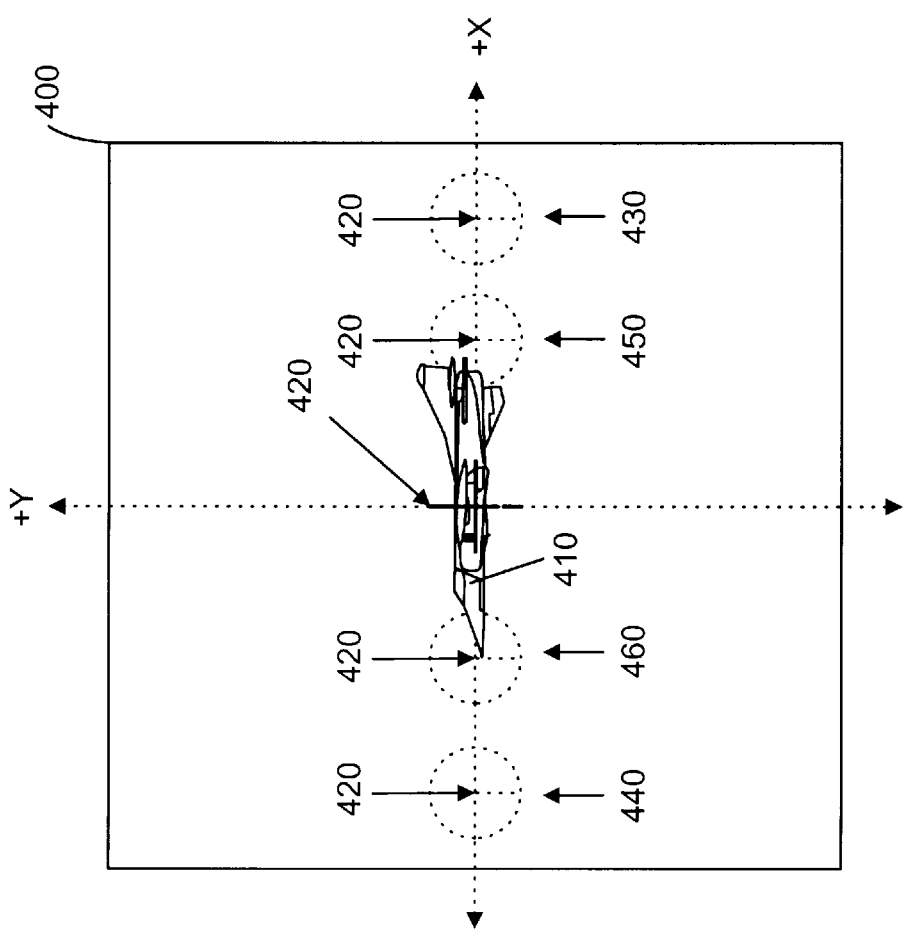

Referring to FIGS. 4A and 4B, there is an illustration of operation of one embodiment of the oscillation detector 210. For simplicity, the oscillation detector 210 is illustrated as a two-dimensional plane, for example, the X–Y plane. More particularly, FIG. 4A illustrates how oscillations in $V_x$ are detected by the oscillation detector 210. It is understood that the operational principles apply to other two-dimensional as well as three-dimensional spaces.

A game environment 400 can be, for example, presented as a video image on a visual display 170 forming part of the computer system 120 in FIG. 1B. A target 410 is located in the center of the game environment 400. This target is, for example, an enemy fighter plane. Centered on the target 410 are cross-hairs 420. The cross-hairs 420 are, for example, the cross-hairs of a "gun" sight. A player controls the position and speed of the cross-hairs 420 in the game environment 400 via the game controller 110. The object of this particular scenario is for the player to place the cross-hairs 420 on the target 410 in preparation to destroy the target 410. In an attempt to place the cross-hairs 420 on the target 410, the player will typically overshoot the target 410.

For example, in FIGS. 4A and 4B, at a first time, $t_1$, the player makes a first attempt 430 to place the cross-hairs 420 on the target 410, thereby overshooting the target 410. At a second time $t_2$, the player makes a second attempt 440 to place the cross-hairs 420 on the target 410. The second attempt 440 also overshoots the target 410, but this time to the opposite side of the target 410 on the X-axis. At a third time $t_3$, the player makes a third attempt 450 to place the cross-hairs 420 on the target 410. At this time, oscillation about a zero object speed is detected by the oscillation detector 210 because consecutive placements 440 and 450 of the cross-hairs 420, fell on opposite sides of the target 410 on the X-axis as shown in FIG. 4B. The zero object speed occurs when the cross-hairs 420 are locked on the target 410 and the player is no longer initiating movement of the game controller 110.

Upon oscillation detection at the third time $t_3$, the sensitivity adjuster 220 adjusts the sensitivity of the game controller 110 so that the player can make more precise movements of the cross-hairs 420 while honing in on the target 410. By detecting the oscillation of the cross-hairs 420 about the zero object speed for any axis, the player gains additional control over the placement of the cross-hairs 420. This additional control is automatically initiated by the oscillation detector 210 in response to the player's oscillating input via the game controller 110. At a fourth time, $t_4$, the player makes a fourth attempt 460 to place the cross-hairs 420 on the target 410, but is unsuccessful. Finally, at a fifth time $t_5$, the player's last attempt successfully places the cross-hairs 420 on the target 410. After the completion of the task at the fifth time $t_5$, or immediately thereafter, the speed of the object starts to increase from the zero object speed and/or exceeds a predetermined threshold, preferably a small speed indicative of the direction of the target 410 in the game environment 400. When this occurs, the sensitivity adjuster 220 returns the sensitivity of the game controller 110 to its pre-oscillation state.

Figure 5:
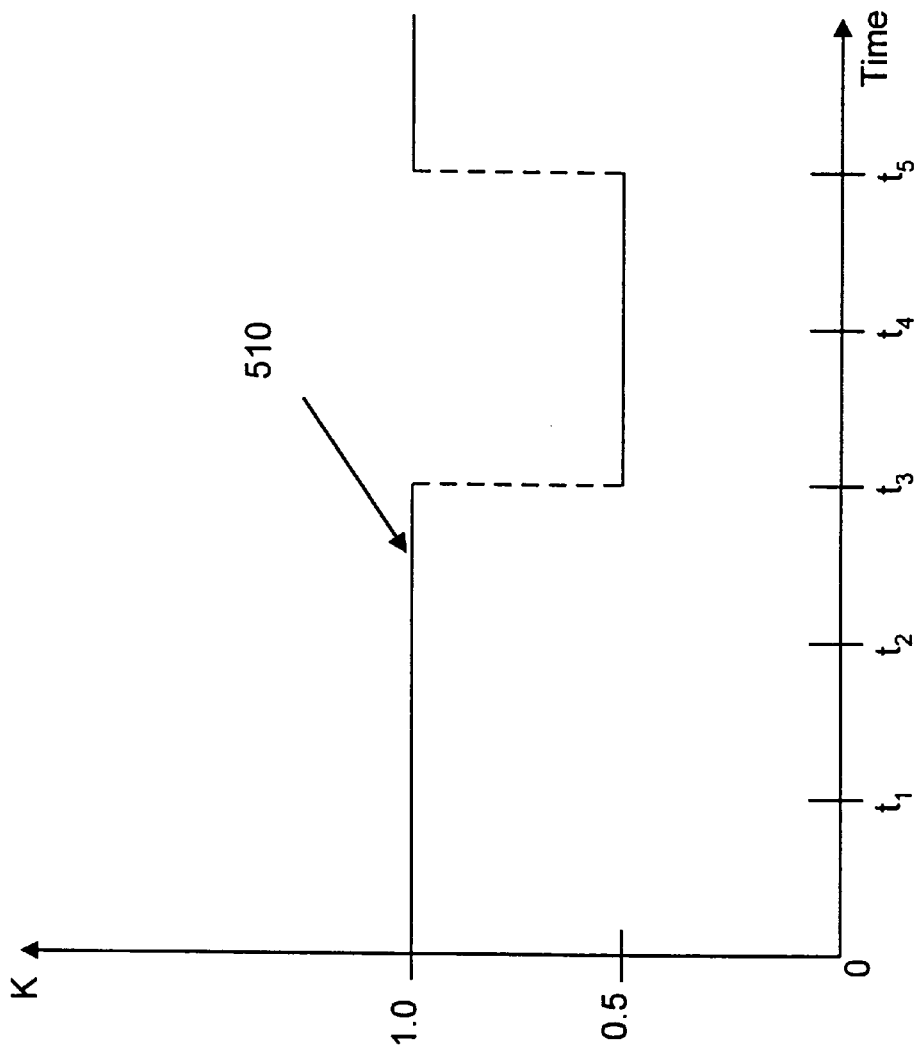
FIG. 5 is a graph illustrating one embodiment of a sensitivity adjuster in accordance with the present invention.

Referring to FIG. 5, there is a two-dimensional graph illustrating one embodiment of the sensitivity adjuster 220. The horizontal axis of the graph represents elapsed time and preferably is in seconds. The vertical coordinate axis of the graph represents a value K, which is the ratio of an instant speed of the object (e.g., cross-hairs 420) in the game environment, over a mechanical displacement of the game controller 110 by the player. The graph further illustrates a sensitivity curve 510. While this curve is shown as a step function, other functions are equally valid for the sensitivity curve 510.

The ratio K is dimensionless and preferably less than or equal to one. Having a K ratio less than one provides the player with greater control over the object for small displacements. The ratio K is also a function of time and can be preset by the player through a player interface in the game software. The boundaries on the range of the ratio K, preferably zero and one, respectively, are set in the game controller itself, but alternatively are set by the operating system (e.g., Windows 95) or the game software.

The ratio K is further illustrated by the following formula:

$$K = S/D,$$

where S is the instant speed of the object along an axis in the game environment 400 and D is the mechanical displacement of the game controller 110 by the player.

Referring again to FIGS. 4A and 4B in conjunction with FIG. 5, the sensitivity curve 510 is further illustrated. In the scenario of FIGS. 4A and 4B, the player is attempting to focus the cross-hairs 420 on the target 410. To successfully hit the target 410, the player attempts to track the target 410 with increasingly precise movements of the game controller 110. These precise movements cause oscillations in the components of $\underline{V}$ which are detected by the oscillation detector 210.

For example, at the first time, $t_1$, no oscillations are yet detected and K is set equal to 1.0, as shown on the graph in FIG. 5. At the third time, $t_3$, however, the oscillation detector 210 detects an oscillation on the player's third attempt 450. Upon detection of the oscillation by the oscillation detector 210, the sensitivity adjuster 220 sets K equal to 0.5, thereby increasing the sensitivity of the game controller 110. At the fifth time, $t_5$, the sensitivity of the game controller 110 is returned to its pre-oscillation state with K equal to one. The reduction of K is illustrated by the sensitivity curve 510 on the graph in FIG. 5.

Figure 6:
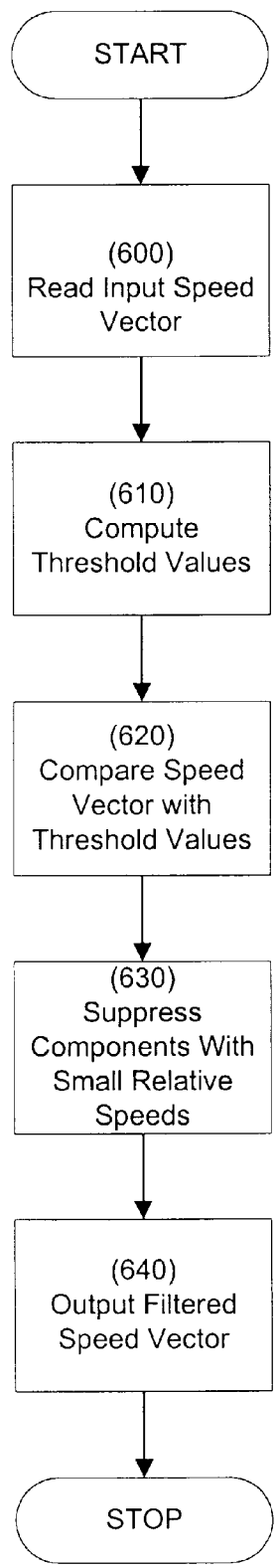
FIG. 6 is a flowchart illustrating operation of one embodiment of the dynamic data filter in accordance with the present invention.

Referring to FIG. 6, there is flowchart describing the operation of one embodiment of the dynamic data filter 200. The game controller 110 is deflected by a player, thereby generating input values indicative of the speed of an object in an n-dimensional game environment 400 which is presented as a video image on a visual display 170. The input values are read 600 by the dynamic data filter 200 as an instant speed vector $\underline{V}$. Next, the value $\alpha |\underline{V}|$ is computed 610 and compared 620 with the components of $\underline{V}$ (e.g., $V_x$, $V_y$, and $V_z$). Those components of the speed vector $\underline{V}$ that have small speeds relative to the other speed vector components are considered noise and suppressed 630. Suppressing 630 one or more components of the speed vector produces a filtered speed vector, $\underline{V}_{filter}$. The filtered speed vector $\underline{V}_{filter}$ is then output 640 to the oscillation detector 210. The dynamic data filter 200 preferably operates continuously as the player manipulates the game controller 110.

Figure 7:
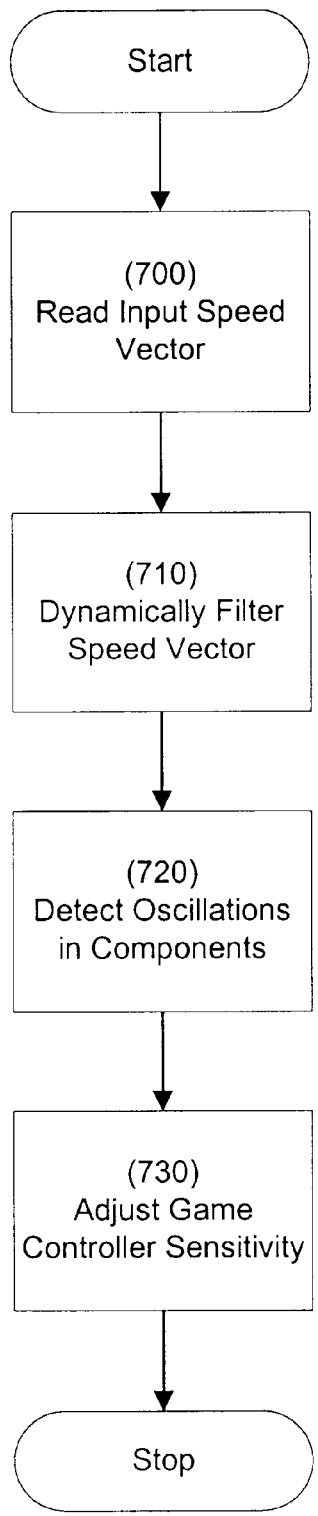
FIG. 7 is a flowchart illustrating operation of one embodiment of the attractor system in accordance with the present invention.

Referring to FIG. 7, there is a flowchart describing the operation of one embodiment of the attractor system 180. The attractor system 180 first receives 700 the filtered speed vector $\underline{V}_{filter}$ from the dynamic data filter 200. Next, the oscillation detector 210 detects 710 oscillations in the components of the filtered speed vector $\underline{V}_{filter}$. In response to such oscillations, the sensitivity adjuster 220 adjusts 730 the sensitivity of the game controller 110 by changing the ratio K of the instant speed of the object (e.g., cross-hairs 420) in the game environment over the mechanical displacement of the game controller 110 by the player. Like the dynamic data filter 200, the attractor system 180 also functions continuously while the player manipulates the game controller 110.

An advantage of the present invention is that game controller sensitivity is automatically adjusted to a player's inputs. The present invention determines, during a game, when and by how much the game controller sensitivity should be adjusted to suit the player's needs for a particular game scenario. The adjusted sensitivity allows the player to make more precise movements of the object in the game environment without a priori information about the game scenario. The present invention also works with a variety of game controllers and game software.

It is a further advantage of the present invention that inter-axis influences caused by undesired, redundant movements of the player's hand are eliminated without reducing the sensitivity of the game controller. Such influences tend to cause the game controller to report axis values that are not under the player's direct or desired control.

Although the present invention has been described in considerable detail with reference to certain preferred embodiments thereof, other embodiments are possible. For example, the attractor system 180 may be implemented in hardware as combination and/or sequential logic. Moreover the attractor system 180 may implemented as an Integrated Circuit (IC). Therefore, the spirit and scope of the appended claims should not be limited to the description of the preferred embodiments herein.

What is claimed is:

1. A system for automatically adjusting the sensitivity of a game controller in response to a player's inputs, comprising:

an oscillation detector having an input and an output, the input coupled to receive from the game controller one or more values indicative of the speed of an object in an n-dimensional game environment, the oscillation detector for detecting at least one oscillating value; and a sensitivity adjuster having an input and an output, the input coupled to the output of the oscillation detector for receiving oscillating values, the sensitivity adjuster for adjusting the oscillating values to increase the sensitivity of the game controller, the output coupled to a computer system for communicating the adjusted values to the game environment.

2. The system of claim 1, further comprising a filter for suppressing those values that are less than a dynamically predetermined threshold.

3. The system of claim 2, wherein the dynamically predetermined threshold is equal to $\alpha|\underline{V}|$, where $\alpha\in(0,1)$, and $|\underline{V}|$ is the magnitude of an n-dimensional speed vector $\underline{V}$, the components of $\underline{V}$ indicative of the speed of the object in the game environment.

4. The system of claim 1, wherein the sensitivity adjuster adjusts the sensitivity of the game controller in response to the player's inputs by scaling the oscillating values with a ratio K according to the formula K=S/D, where S is the speed of the object along an axis in the game environment and D is a mechanical displacement of the game controller by the player.

5. The system of claim 4, wherein K changes as a function of time and has a value in the range from about 0 to about 1.

6. A computer readable medium having stored thereon instructions which, when executed by a processor, cause the processor to perform the steps of:

detecting oscillating values generated by a game controller, the values indicative of the speed of an object in a game environment; and adjusting the sensitivity of the game controller in response to the oscillating values so that a player gains additional control over the object in the game environment.

7. The computer-readable medium of claim 6 further including the step of:

filtering those values generated by the game controller that are less than a dynamically predetermined threshold.

8. A computer-implemented method for automatically adjusting the sensitivity of a game controller in response to a player's inputs, comprising the steps of:

detecting oscillating values generated by the game controller, the values indicative of the speed of an object controlled by the player in a game environment; and adjusting the sensitivity of the game controller in response to the oscillating values so that the player gains additional control over the speed of the object in the game environment.

9. The method of claim 8, further including the step of filtering those values generated by the game controller that are less than a predetermined threshold.

10. The method of claim 8, further including the step of scaling the oscillating values with a ratio K according to the formula K=S/D, where S is the speed of the object along an axis in the game environment and D is a mechanical displacement of the game controller by the player.

11. The method of claim 9, further including the step of comparing the values with the dynamically predetermined threshold $\alpha|\underline{V}|$, where $\alpha\in(0,1)$, and $|\underline{V}|$ is the magnitude of a speed vector $\underline{V}$, the components of $\underline{V}$ indicative of the speed of the object in the game environment.

12. A system for automatically adjusting the sensitivity of a game controller in response to a player's inputs, comprising:

means for detecting oscillating values generated by the game controller, the values indicative of the speed of an object controlled by the player in a game environment; and means for adjusting the sensitivity of the game controller in response to the oscillating values so that the player gains additional control over the speed of the object in the game environment.

13. The computer readable medium of claim 6, further including the step of:

scaling the oscillating values with a ratio K according to the formula K=S/D, where S is the speed of the object along an axis in the game environment and D is a mechanical displacement of the game controller by the player.

14. The computer readable medium of claim 6, further including the step of:

comparing the values with the dynamically predetermined threshold $\alpha|V|$, where $\alpha\in(0,1)$, and $|V|$ is the magnitude of a speed vector V, the components of V indicative of the speed of the object in the game environment.

* * * * *